United States Patent
Isobe et al.

(12) 
(10) Patent No.: US 6,433,033 B1
(45) Date of Patent: Aug. 13, 2002

(54) HIGH-DURABILITY FLEXIBLE POLYURETHANE COLD CURE MOLDED FOAM AND PROCESS FOR PRODUCING THE SAME

(75) Inventors: Masahiro Isobe; Kazuhiko Ohkubo; Seijiro Sakai, all of Yokohama (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/502,088

(22) Filed: Feb. 10, 2000

(30) Foreign Application Priority Data

Feb. 10, 1999 (JP) .......................................... 11-032871

(51) Int. Cl.$^7$ ................................................. C08G 18/10
(52) U.S. Cl. ...................... 521/170; 521/137; 521/155; 521/163; 521/168; 521/174
(58) Field of Search ................................ 521/155, 174, 521/137, 170, 163, 168

(56) References Cited

U.S. PATENT DOCUMENTS 5,459,172 A 10/1995 Kaku et al.
5,700,847 A 12/1997 Thompson

FOREIGN PATENT DOCUMENTS

EP 0367283 A 5/1990
EP 0677543 A 10/1995

OTHER PUBLICATIONS

Database WPI, Section Ch, Week 199252, Derwent Publications, Ltd. London, GB; Class A25, AN 1992–430165 XP002137978 & JP 04 328114 A (Mitsubishi Kasei Dow KK), Nov. 17, 1992 Abstract.
Journal of General Chemistry of the USSR, vol. 55, No. 7, pp. 1633–1634, Jul., 1985.

*Primary Examiner*—John M. Cooney, Jr.
(74) *Attorney, Agent, or Firm*—Birch, Stewart, Kolasch & Birch, LLP

(57) ABSTRACT

The high-durability flexible polyurethane cold cure molded foam of the invention has an overall density of not less than 35 kg/m$^3$ and not more than 45 kg/m$^3$ and a wet heat compression set of not more than 15%, and preferably has a hardness change ratio, as determined in a repeated compression test, of not more than 15%. This foam can be obtained by the process of the invention. The process of the invention is a process for producing a flexible polyurethane cold cure molded foam obtained from a polyol and/or a polymer polyol containing dispersed polymer microparticles obtained by radical polymerizing a compound having an unsaturated bond in the polyol, water, a catalyst and a polyisocyanate, wherein the polyol is a polyol synthesized by the use of a catalyst containing at least one compound selected from the group consisting of a compound having a nitrogen-phosphorus double bond, cesium hydroxide and rubidium hydroxide. The foam of the invention has a low density and is excellent in durability, particularly in hardness change ratio in a repeated compression test and wet heat compression set. According to the process of the invention, such a foam can be obtained.

13 Claims, No Drawings

HIGH-DURABILITY FLEXIBLE POLYURETHANE COLD CURE MOLDED FOAM AND PROCESS FOR PRODUCING THE SAME

FIELD OF THE INVENTION

The present invention relates to high-durability flexible polyurethane cold cure molded foams and a process for producing the foams. More particularly, the invention relates to flexible polyurethane cold cure molded foams which are lightweight, have improved durability such as wet heat compression set and are favorably used for interior trims of vehicles, cushioning materials for furniture, bedding and miscellaneous goods, and to a process for producing the foams.

BACKGROUND OF THE INVENTION

Because of their cushioning properties, flexible polyurethane cold cure molded foams (sometimes referred to as "flexible foams" hereinafter) are widely used for vehicles, furniture, bedding and miscellaneous goods. Such flexible foams are produced by reacting an aromatic polyisocyanate with a polyol and/or a polymer polyol containing dispersed polymer particles obtained by radical polymerizing acrylonitrile and/or styrene in the polyol, in the presence of water as a blowing agent, a silicone base surfactant, a catalyst such as amine or a tin compound, and if necessary, a crosslinking agent, and additives such as a flame retardant and a pigment.

Water functions as a blowing agent, that is, water reacts with an aromatic polyisocyanate to generate a carbonic acid gas which acts as a blowing gas, and at the same time, an aromatic polyurea is produced. Recently, use of CFC-11 ($CCl_3F$) has been prohibited by the Montreal Protocol for the purpose of global environmental protection. As a result, the amount of water used in the formulation has been increased so as to counterbalance the blowing effect of the conventional blowing additive (physical blowing agent).

In recent years, further, reduction in cost of flexible foams has been strongly demanded, and low density of flexible foams is desired for the purpose of weight reduction. In application of flexible foams for vehicles, lowering of foam density is also required for weight reduction to cope with regulation of fuel consumption. In order to satisfy the requirement of low density, the amount of water used as the blowing agent tends to be further increased.

Increase of the amount of water used leads to greater amount of the carbonic acid gas generated and is thus effective for lowering of density of the flexible foam. However, if the amount of the aromatic polyurea produced at the same time is increased, it becomes difficult to maintain durability of the flexible foam such as compression set property. Moreover, lowering of the density of the flexible foam per se causes deterioration of durability such as compression set property of the flexible foam.

Deterioration of the compression set property means that the shape stability of the flexible foam is bad, and this leads various inconveniences. For example, the thickness of bedding cushions is reduced in the course of use, or the thickness or hardness of cushions for vehicles varies in the course of use. Particularly in cushions for vehicles, long time driving reduces thickness or hardness of the cushions initially designed. As a result, the prescribed position of the driver is lowered, or sitting or riding comfort is impaired. These problems are those on the durability of the flexible foam, and the durability can be evaluated by a change of hardness in a repeated compression test or a wet heat compression set.

Accordingly, there has been desired development of flexible polyurethane cold cure molded foams which are lightweight and have a small wet heat compression set and a low hardness change ratio in a repeated compression test, namely, excellent durability.

Under such circumstances, the present inventors have made various studies, and as a result, they have-found a flexible polyurethane cold cure molded foam which has excellent durability in spite of a low density. Based on the finding, the present invention has been accomplished. The present inventors have also found that a flexible foam having excellent durability can be produced efficiently by using a polymer and/or a polymer polyol containing dispersed polymer microparticles (vinyl polymer particles) obtained by radical polymerizing a compound having an unsaturated bond such as acrylonitrile or styrene in the polyol and by using, as the polyol, a polyol synthesized by the use of a catalyst containing at least one compound selected from the group consisting of a compound having a nitrogen-phosphorus double bond, cesium hydroxide and rubidium hydroxide. Based on the finding, the process of the present invention has been accomplished.

OBJECT OF THE INVENTION

The present invention is intended to solve such problems associated with the prior art as described above, and it is an object of the invention to provide a flexible polyurethane cold cure molded foam which has a lower density and is excellent in durability, particularly in hardness change ratio in a repeated compression test and thickness change properties such as wet heat compression set. It is another object of the invention to provide a process for producing the foam.

In the production process provided by the invention, it is the other object to provide a process capable of economically producing a high-durability flexible polyurethane cold cure molded foam using a resin premix which exhibits excellent moldability in the production of flexible foam.

SUMMARY OF THE INVENTION

The flexible polyurethane cold cure molded foam according to the invention has an overall density of not less than 35 $kg/m^3$ and not more than 45 $kg/m^3$ and a wet heat compression set of not more than 15%.

The flexible polyurethane cold cure molded foam according to the invention preferably has a hardness change ratio, as determined in a repeated compression test, of not more than 15%.

The flexible polyurethane cold cure molded foam according to the invention is preferably a flexible polyurethane cold cure molded foam obtained from a polyol and/or a polymer polyol containing dispersed polymer microparticles obtained by radical polymerizing a compound having an unsaturated bond in the polyol, water, a catalyst, a polyisocyanate, and if necessary, a crosslinking agent and/or a foam stabilizer, wherein:

the polyol is a polyoxyalkylene polyol selected from the group consisting of (1) a polyoxyalkylene polyol having a hydroxyl value of not less than 15 mgKOH/g and not more than 25 mgKOH/g and overall degree of unsaturation of not more than 0.060 meq/g, (2) a polyoxyalkylene polyol having a hydroxyl value exceeding 25 mgKOH/g and not more than 35 mgKOH/g and overall degree of unsaturation of not more than 0.050 meq/g, and (3) a polyoxyalkylene polyol having a hydroxyl value exceeding 35 mgKOH/g and not more than 45 mgKOH/g and overall degree of unsaturation of not more than 0.040 meq/g.

The polyol is preferably one synthesized by the use of a catalyst containing at least one compound selected from the group consisting of a compound having a nitrogen-phosphorus double bond, cesium hydroxide and rubidium hydroxide.

The viscosity of a resin premix containing the polyol and/or the polymer polyol, water, the catalyst, and if necessary, the crosslinking agent and/or the foam stabilizer is preferably not more than 2500 mPa.s.

The polyisocyanate is preferably tolylene diisocyanate or a mixture of tolylene diisocyanate and polymethylenepolyphenyl polyisocyanate in a weight ratio of 98:2 to 50:50, said polymethylenepolyphenyl polyisocyanate being represented by the following formula (1):

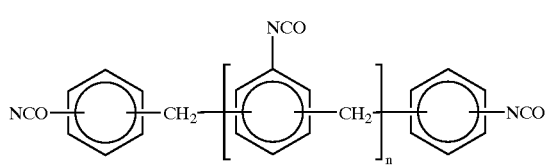

(1)

wherein n is 0 or an integer of 1 or more.

The compound having a nitrogen-phosphorus double bond is preferably a phosphazenium compound or a phosphine oxide compound.

The process for producing a flexible polyurethane cold cure molded foam according to the invention is a process for producing a flexible polyurethane cold cure molded foam obtained from a polyol and/or a polymer polyol containing dispersed polymer microparticles obtained by radical polymerizing a compound having an unsaturated bond in the polyol, water, a catalyst, a polyisocyanate, and if necessary, a crosslinking agent and/or a foam stabilizer, wherein:

the polyol is a polyoxyalkylene polyol selected from the group consisting of (1) a polyoxyalkylene polyol having a hydroxyl value of not less than 15 mgKOH/g and not more than 25 mgKOH/g and overall degree of unsaturation of not more than 0.060 meq/g, (2) a polyoxyalkylene polyol having a hydroxyl value exceeding 25 mgKOH/g and not more than 35 mgKOH/g and overall degree of unsaturation of not more than 0.050 meq/g, and (3) a polyoxyalkylene polyol having a hydroxyl value exceeding 35 mgKOH/g and not more than 45 mgKOH/g and overall degree of unsaturation of not more than 0.040 meq/g.

The flexible polyurethane cold cure molded foam obtained by the above process has an overall density of not less than 35 kg/cm$^3$ and not more than 45 kg/m$^3$ and a wet heat compression set of not more than 15%, and further has a hardness change ratio as determined in a repeated compression test, of not more than 15%.

The polyol is preferably one synthesized by the use of a catalyst containing at least one compound selected from the group consisting of a compound having a nitrogen-phosphorus double bond, cesium hydroxide and rubidium hydroxide.

The viscosity of a resin premix containing the polyol and/or the polymer polyol, water, the catalyst, and if necessary, the crosslinking agent and/or the foam stabilizer is preferably not more than 2500 mPa.s.

The polyisocyanate is preferably tolylene diisocyanate or a mixture of tolylene diisocyanate and polymethylenepolyphenyl polyisocyanate represented by the aforesaid formula (I) in a weight ratio of 98:2 to 50:50.

The compound having a nitrogen-phosphorus double bond is preferably a phosphazenium compound or a phosphine oxide compound.

According to the invention, a flexible polyurethane cold cure molded foam which is lightweight and has a low wet heat compression set and a low hardness change ratio in a repeated compression test, namely, excellent durability can be provided.

DETAILED DESCRIPTION OF THE INVENTION

The flexible polyurethane cold cure molded foam according to the invention and the process for producing the foam are described in detail hereinafter.

Flexible Polyurethane Cold Cure Molded Foam

The flexible polyurethane cold cure molded foam according to the invention has an overall density of not less than 35 kg/m$^3$ and not more than 45 kg/m$^3$ and a wet heat compression set of not more than 15%, and preferably has an overall density of not less than 35 kg/m$^3$ and not more than 43 kg/m$^3$ and a wet heat compression set of not more than 15% and not less than 8%

The flexible polyurethane cold cure molded foam according to the invention has a hardness change ratio, as determined in a repeated compression test, of preferably not more than 15%, more preferably not more than 14% and not less than 8%, most preferably not more than 12% and not less than 8%.

The flexible polyurethane cold cure molded foam according to the invention has an elongation of not less than 50% and not more than 500%, preferably not less than 80% and not more than 500%, more preferably not less than 100% and not more than 350%.

Process for Producing Flexible Polyurethane Cold Cure Molded Foam

The flexible polyurethane cold cure molded foam of the invention is produced by reacting polyisocyanate, a blowing agent (water) and a catalyst with any one of the following compounds and mixtures (a) to (g).

In the production process, a foam stabilizer, a crosslinking agent and other additives may be used singly or in combination of two or more kinds without imparing the objects of the invention. The foam stabilizer, the crosslinking agent and other additives may be added to either any one of the following compounds and mixtures (a) to (g) or the polyisocyanate, or both of them, or they may be added to a mixing machine for mixing the polyisocyanate, the blowing agent (water) and the catalyst with any one of the following compounds and mixtures (a) to (g), or a reactor.

(a) a polyol alone
(b) a mixture of plural polyols
(c) a polymer polyol alone
(d) a mixture of plural polymer polyols
(e) a mixture of a polyol and a polymer polyol
(f) a mixture of plural polyols and a polymer polyol
(g) a mixture of plural polyols and plural polymer polyols

Polyol

Examples of the polyols to be reacted with polyisocyanate in the production of the flexible polyurethane cold cure molded foam of the invention include:

dihydric alcohols, such as ethylene glycol and propylene glycol;

trihydric alcohols, such as glycerol and trimethylolpropane;

tetrahydric alcohols, such as pentaerythritol and diglycerol;

polyoxyalkylene polyols; and polyester polyols.

Of these, preferably used are polyoxyalkylene polyols and polyester polyols, and particularly preferably used are polyoxyalkylene polyols.

These polyols may be used singly or in combination of two or more kinds.

In the present invention, the hydroxyl value of the polyol is preferably not less than 15 mgKOH/g and not more than 45 mgKOH/g, more preferably not less than 20 mgKOH/g and not more than 35 mgKOH/g.

In addition, when a polyoxyalkylene polyol is used as a polyol, a polyoxyalkylene polyol containing constituent units derived from ethylene oxide in amounts (ethylene oxide content) of not less than 20% by weight based on 100% by weight of the total constituent units derived from alkylene oxides and having a hydroxyl value of not less than 15 mgKOH/g and not more than 100 mgKOH/g can be used in an amount of 0.5 to 30 parts by weight based on 100 parts by weight of other polyoxyalklene polyol to blend with said other polyoxyalkylene polyol which has an ethylene oxide content of less than 20% by weight.

Polyoxyalkylene Polyol

The polyoxyalkylene polyol preferably used in the invention is an oligomer to a polymer obtained by ring-opening polymerization of an alkylene oxide, and is generally obtained by ring-opening polymerizing an alkylene oxide using an active hydrogen compound as an initiator in the presence of a catalyst. The polyoxyalkylene polyol thus obtained may be used singly or in combination of two or more kinds. The polyoxyalkylene polyol is sometimes referred to as a "polyoxyalkylene polyether polyol".

In the preparation of the polyoxyalkylene polyol, the initiator and the alkylene oxide may be each used singly or in combination of two or more kinds. As the catalyst, a polyol-synthesizing catalyst containing at least one compound selected from the group consisting of a compound having a nitrogen-phosphorus double bond, cesium hydroxide and rubidium hydroxide is used.

When such a polyol-synthesizing catalyst is used, the molecular weight of a polyoxyalkylene polyol is increased and production of a monool having an unsaturated group at a terminal of the molecule is inhibited, so that a polyoxyalkylene polyol having an extremely lower content of monool can be prepared, as compared with the case of using a potassium hydroxide catalyst as a polyol-synthesizing catalyst. The molecular weight of the monool is lower than that of the polyoxyalkylene polyol produced by the main reaction, and therefore the monool sometimes markedly widens the molecular weight distribution of the polyoxyalkylene polyol and thereby may decrease the average number of functional groups. For this reason, the monool content in the polyoxyalkylene polyol is preferably as low as possible. The monool content in the polyoxyalkylene polyol is generally indicated by overall degree of unsaturation, so that as the value of the overall degree of unsaturation becomes lower the monool content becomes lower.

The polyoxyalkylene polyol preferably used in the invention is:

(1) a polyoxyalkylene polyol having a hydroxyl value of not less than 15 mgKOH/g and not more than 25 mgKOH/g and overall degree of unsaturation of not more than 0.060 meq/g, preferably not more than 0.040 meq/g, more preferably not more than 0.025 meq/g, (2) a polyoxyalkylene polyol having a hydroxyl value exceeding 25 mgKOH/g and not more than 35 mgKOH/g and overall degree of unsaturation of not more than 0.050 meq/g, preferably not more than 0.030 meq/g, more preferably not more than 0.020 meq/g, or (3) a polyoxyalkylene polyol having a hydroxyl value exceeding 35 mgKOH/g and not more than 45 mgKOH/g and overall degree of unsaturation of not more than 0.040 meq/g, preferably not more than 0.020 meq/g, more preferably not more than 0.015 meq/g.

These polyoxyalkylene polyols can be each used singly or in combination of two or more kinds.

In the preparation of a polyoxyalkylene polyol, it is preferable to use a polyol-synthesizing catalyst containing at least one compound selected from the group consisting of a compound having a nitrogen-phosphorus double bond, cesium hydroxide and rubidium hydroxide, because a polyoxyalkylene polyol containing small amount of a monool having an unsaturated group at a terminal of the molecule or a polyoxyalkylene polyol substantially not containing such a monool can be obtained, and by the use of such a polyoxyalkylene polyol, a flexible polyurethane foam excellent in hysteresis, elongation and curing characteristics can be easily obtained.

As a matter of course, the monool or a polyoxyalkylene polyol containing the monool may be used without departing from the spirit of the present invention.

In the synthesis of a polyoxyalkylene polyol by ring-opening polymerization of propylene oxide, an oxypropylene group can be bonded by head-to-head linkage or head-to-tail linkage. A high selectivity of the head-to-tail linkage is preferable because stability of the flowed foam is enhanced. More specifically, a polyoxypropylene polyol having a head-to-tail linkage selectivity of not less than 96% is preferable. As a matter of course, the polyoxypropylene polyol may have a segment derived from an alkylene oxide other than propylene oxide, such as ethylene oxide.

Catalyst for Preparing Polyoxyalkylene Polyol

In the present invention, a catalyst containing at least one compound selected from the group consisting of a compound having a nitrogen-phosphorus double bond, cesium hydroxide and rubidium hydroxide is used in the preparation of a polyoxyalkylene polyol.

Compound Having Nitrogen-phosphorus Double Bond

Although there is no specific limitation on the compound having a nitrogen-phosphorus double bond used as the catalyst for use in the invention for preparing a polyoxyalkylene polyol,-a phosphazenium compound or a phosphine oxide compound is preferable.

Phosphazenium Compound

The phosphazenium compound for use in the invention is represented by the following formula (2) or (3), and is a salt of a phosphazenium cation and an anion of an active hydrogen compound.

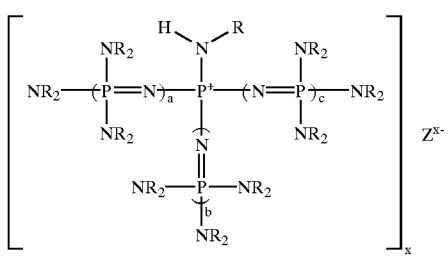

(2)

In the formula (2), a, b and c are each 0 or a positive integer of 3 or less and are not 0 at the same time; each R is the same or different and is a hydrocarbon group of 1 to 10 carbon atoms, and two of R on each common nitrogen atom are sometimes bonded to each other to form a ring structure; x is the number of phosphazenium actions; and $Z^{x-}$ is an x-valent anion of an active hydrogen compound.

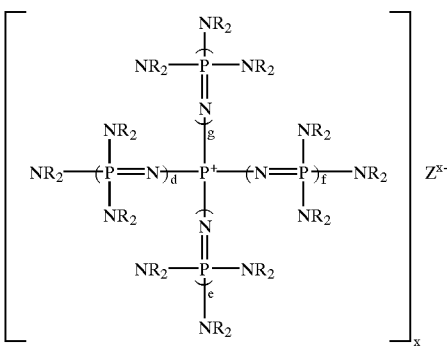

(3)

In the formula (3), d, e, f and g are each 0 or a positive integer of 3 or less and are not 0 at the same time; each R is the same or different and is a hydrocarbon group of 1 to 10 carbon atoms, and two of R-on each common nitrogen atom are sometimes bonded to each other to form a ring structure; x is the number of phosphazenium actions; and $Z^{x-}$s an x-valent anion of an active hydrogen compound.

In the above formulas, the phosphazenium cation is represented by the limiting structure having the electrical charge localized on the central phosphorus atom, however, other numerous limiting structures can be shown, and in practice, the electrical charge is delocallized on the whole portion.

In the formula (2) which represents the phosphazenium compound, a, b and c are each 0 or a positive integer of 3 or less, preferably 0 or a positive integer of 2 or less. More preferably, a, b and c are numerical values of a combination selected from combinations of (2, 1, 1), (1, 1, 1), (0, 1, 1) and (0, 0, 1) regardless of the order of a, b and c.

In the formula (3) which represents the phosphazenium compound, d, e, f and g are each 0 or a positive integer of 3 or less, preferably 0 or a positive integer of 2 or less. More preferably, d, e, f and g are numerical values of a combination selected from combinations of (2, 1, 1, 1), (1, 1, 1, 1), (0, 1, 1, 1), (0, 0, 1, 1) and (0, 0, 0, 1) regardless of the order of d, e, f and g. Still more preferably, d, e, f and g are numerical values of a combination selected from combinations of (1, 1, 1, 1), (0, 1, 1, 1), (0, 0O 1, 1) and (0, 0, 0, 1) regardless of the order.

In the formula (2) or (3) which represents the phosphazenium compound, each R is the same or different and is an aliphatic or an aromatic hydrocarbon group of 1 to 10 carbon atoms.

Specifically, R is selected from aliphatic or aromatic hydrocarbon groups, such as methyl, ethyl, n-propyl, isopropyl, allyl, n-butyl, sec-butyl, tert-butyl, 2-butenyl, 1-pentyl, 2-pentyl, 3-pentyl, 2-methyl-1-butyl, isopentyl, tert-pentyl, 3-methyl-2-butyl, neopentyl, n-hexyl, 4-methyl-2-pentyl, cyclopentyl, cyclohexyl, 1-heptyl, 3-heptyl, 1-octyl, 2-octyl, 2-ethyl-l-hexyl, 1,1-dimethyl-3,3-dimethylbutyl (commonly called "tert-octyl"), nonyl, decyl, phenyl, 4-toluyl, benzyl, 1-phenylethyl and 2-phenylethyl. Of these, preferable are aliphatic hydrocarbon groups such as methyl, ethyl, n-propyl, isopropyl, tert-butyl, tert-pentyl and 1,1-dimethyl-3,3-dimethylbutyl.

When two of R on each common nitrogen atom in the formula (2) or (3) which represents the phosphazenium compound are bonded to each other to form a ring structure, the divalent group (R-R) on the nitrogen atom is a divalent hydrocarbon group having a main chain of 4 to 6 carbon atoms (the ring becomes a 5- to 7-membered ring containing a nitrogen atom), such as tetramethylene, pentamethylene or hexamethylene, and the main chain of the hydrocarbon group may have an alkyl substituent such as methyl or ethyl. Of these, tetramethylene or pentamethylene is preferable. All possible nitrogen atoms in the phosphazenium cation may form such ring structures, or a part of them may form such ring structures.

In the formula (2) or (3) which represents the phosphazenium compound, x is usually 1 to 8, preferably 1, although it varies depending upon the type of the active hydrogen compound.

Phosphine Oxide Compound

The phosphine oxide compound for use in the invention is represented by the following formula (4):

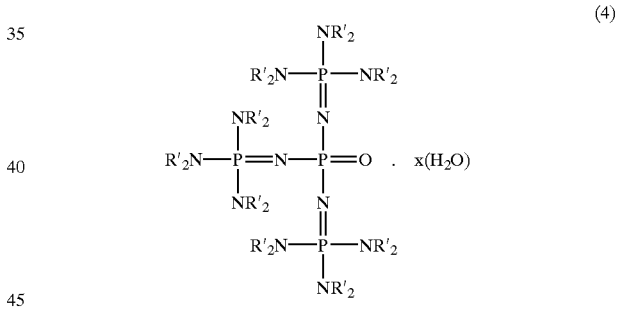

(4)

wherein each R' is the same or different and is a hydrogen atom or a hydrocarbon group of 1 to 10 carbon atoms; and x indicates a content of water molecules in terms of molar ratio and is 0 to 5.0.

In the formula (4) which represents the phosphine oxide compound, each R' is the same or different and is a hydrogen atom or a hydrocarbon group of 1 to 10 carbon atoms. Specifically, the hydrocarbon group of 1 to 10 carbon atoms indicated by R' is selected from aliphatic or aromatic hydrocarbon groups, such as methyl, ethyl, n-propyl, isopropyl, allyl, n-butyl, sec-butyl, tert-butyl, 2-butenyl, 1-pentyl, 2-pentyl, 3-pentyl, 2-methyl-1-butyl, isopentyl, tert-pentyl, 3-methyl-2-butyl, neopentyl, n-hexyl, 4-methyl-2-pentyl, cyclopentyl, cyclohexyl, 1-heptyl, 3-heptyl, 1-octyl, 2-octyl, 2-ethyl-1-hexyl, 1,1-dimethyl-3,3-dimethylbutyl (commonly called "tert-octyl"), nonyl, decyl, phenyl, 4-toluyl, benzyl, 1-phenylethyl and 2-phenylethyl. Of these, preferable are aliphatic hydrocarbon groups of 1 to 8 carbon atoms, such as methyl, ethyl, n-propyl, isopropyl, tert-butyl, tert-pentyl and 1,1-dimethyl-3,3-dimethylbutyl, and more preferable are methyl and ethyl.

The phosphine oxide compound represented by the formula (4) can be synthesized by the process described in G. N. Koidan, et al. Journal of General Chemistry of the USSR, Vol. 55, p. 1453, 1985, or its analogous process.

The phosphine oxide compound represented by the formula (4) generally has hygroscopicity and is liable to become a hydrous product or a hydrate thereof. x which indicates the amount of water molecules contained in the compound is in the range of usually 0 to 5.0, preferably 0 to 2.0, in terms of a molar ratio to the phosphine oxide. This water content is at most about several times the catalytic amount, so that even if hydrolysis of the starting materials or oxyalkylene derivatives takes place due to the water ingredient, the degree of hydrolysis is very low, and the hydrolysis does not impair the object of the invention.

Active Hydrogen Compound for Preparing Polyoxyalkylene Polyol

The active hydrogen compound used as an initiator in the preparation of a polyoxyalkylene polyol is, for example, an active hydrogen compound having an active hydrogen atom on the oxygen atom or an active hydrogen compound having an active hydrogen atom on the nitrogen atom.

Examples of the active hydrogen compounds having an active hydrogen atom on the oxygen atom include:

water;
carboxylic acids having 1 to 20 carbon atoms, such as formic acid, acetic acid, propionic acid, butyric acid, isobutyric acid, lauric acid, stearic acid, oleic acid, phenylacetic acid, dihydrocinnamic acid, cyclohexanecarboxylic acid, benzoic acid, paramethylbenzoic acid and 2-carboxynaphthalene;
polycarboxylic acids having 2 to 20 carbon atoms and 2 to 6 carboxyl groups, such as oxalic acid, malonic acid, succinic acid, maleic acid, fumaric acid, adipic acid, itaconic acid, butanetetracarboxylic acid, phthalic acid, isophthalic acid, terephthalic acid, trimellitic acid and pyromellitic acid;
carbamic acids, such as n,n-diethylcarbamic acid, n-carboxypyrrolidone, n-carboxyaniline and n,n'-dicarboxy-2,4-toluenediamine;
alcohols having 1 to 20 carbon atoms, such as methanol, ethanol, n-propanol, isopropanol, n-butyl alcohol, sec-butyl alcohol, tert-butyl alcohol, isopentyl alcohol, tert-pentyl alcohol, n-octyl alcohol, lauryl alcohol, cetyl alcohol, cyclopentanol, cyclohexanol, allyl alcohol, crotyl alcohol, methylvinylcarbinol, benzyl alcohol, 1-phenylethyl alcohol, triphenylcarbinol and cinnamyl alcohol;
polyhydric alcohols having 2 to 20 carbon atoms and 2 to 8 hydroxyl groups, such as ethylene glycol, propylene glycol, diethylene glycol, dipropylene glycol, 1,3-propanediol, 1,3-butanediol, 1,4-butanediol, 1,6-hexanediol, 1,4-cyclohexanediol, trimethylolpropane, glycerol, diglycerol, pentaerythritol and dipentaerythritol;
saccharides and derivatives thereof, such as glucose, sorbitol, dextrose, fructose and sucrose;
aromatic compounds having 6 to 20 carbon atoms and 1 to 3 hydroxyl groups, such as phenol, 2-naphthol, 2,6-dihydroxynaphthalene and bisphenol A; and
polyalkylene oxides having 2 to 8 terminals and 1 to 8 hydroxyl groups at the terminals, such as polyethylene oxide, polypropylene oxide and copolymers thereof.

Examples of the active hydrogen compounds having an active hydrogen atom on the nitrogen atom include:

aliphatic or aromatic primary amines having 1 to 20 carbon atoms, such as methylamine, ethylamine, n-propylamine, isopropylamine, n-butylamine, isobutylamine, sec-butylamine, tert-butylamine, cyclohexylamine, benzylamine, β-phenylethylamine, aniline, o-toluidine, m-toluidine and p-toluidine;
aliphatic or aromatic secondary amines having 2 to 20 carbon atoms, such as dimethylamine, methylethylamine, diethylamine, di-n-propylamine, ethyl-n-butylamine, methyl-sec-butylamine, dipentylamine, dicyclohexylamine, n-methylaniline and diphenylamine;
polyvalent amines having 2 to 20 carbon atoms and 2 to 3 primary or secondary amino groups, such as ethylenediamine, di(2-aminoethyl)amine, hexamethylenediamine, 4,4'-diaminodiphenylmethane, tri(2-aminoethyl)amine, n,n'-dimethylethylenediamine, n,n'-diethylethylenediamine and di(2-methylaminoethyl)amine;
saturated cyclic secondary amines having 4 to 20 carbon atoms, such as pyrrolidine, piperidine, morpholine and 1,2,3,4-tetrahydroquinoline;
unsaturated cyclic secondary amines having 4 to 20 carbon atoms, such as 3-pyrroline, pyrrole, indole, carbazole, imidazole, pyrazole and purine;
cyclic polyvalent amines having 4 to 20 carbon atoms and 2 to 3 secondary amino groups, such as piperazine, pyrazine and 1,4,7-triazacyclononane;
unsubstituted or n-mono-substituted acid amides having 2 to 20 carbon atoms, such as acetamide, propionamide, n-methylpropionamide, n-methylbenzamide and n-ethylstearamide;
cyclic amides having 5 to 7 members, such as 2-pyrrolidone and c-caprolactam; and
dicarboxylic acid imides having 4 to 10 carbon atoms, such as succinimide, maleimide and phthalimide.

Of the above active hydrogen compounds, preferable are:

water;
alcohols having 1 to 20 carbon atoms, such as methanol, ethanol, n-propanol, isopropanol, n-butyl alcohol, sec-butyl alcohol, tert-butyl alcohol, isopentyl alcohol, tert-pentyl alcohol, n-octyl alcohol, lauryl alcohol, cetyl alcohol, cyclopentanol, cyclohexanol, allyl alcohol, crotyl alcohol, methylvinylcarbinol, benzyl alcohol, 1-phenylethyl alcohol, triphenylcarbinol and cinnamyl alcohol;
polyhydric alcohols having 2 to 20 carbon atoms and 2 to 8 hydroxyl groups, such as ethylene glycol, propylene glycol, diethylene glycol, dipropylene glycol, 1,3-propanediol, 1,3-butanediol, 1,4-butanediol, 1,6-hexanediol, 1,4-cyclohexanediol, trimethylolpropane, glycerol, diglycerol, pentaerythritol and dipentaerythritol;
saccharides and derivatives thereof, such as glucose, sorbitol, dextrose, fructose and sucrose;
polyalkylene oxides having 2 to 8 terminals and 1 to 8 hydroxyl groups at the terminals and having a molecular weight of 100 to 50,000, such as polyethylene oxide, polypropylene oxide and copolymers thereof;
polyvalent amines having 2 to 20 carbon atoms and 2 to 3 primary or secondary amino groups, such as ethylenediamine, di(2-aminoethyl)amine, hexamethylenediamine, 4,4'-diaminodiphenylmethane, tri(2-aminoethyl)amine, n,n'-dimethylethylenediamine, n,n'-diethylethylenediamine and di(2-methylaminoethyl)amine;

saturated cyclic secondary amines having 4 to 20 carbon atoms, such as pyrrolidine, piperidine, morpholine and 1,2,3,4-tetrahydroquinoline; and cyclic polyvalent amines having 4 to 20 carbon atoms and 2 to 3 secondary amino groups, such as piperazine, pyrazine and 1,4,7-triazacyclononane.

More preferable are:

water;

alcohols having 1 to 10 carbon atoms, such as methanol, ethanol, n-propanol, isopropanol, n-butyl alcohol, sec-butyl alcohol, tert-butyl alcohol, isopentyl alcohol, tert-pentyl alcohol and n-octyl alcohol;.

polyhydric alcohols having 2 to 10 carbon atoms and 2 to 4 hydroxyl groups, such as ethylene glycol, diethylene glycol, propyleneglycol, dipropyleneglycol, 1,4-butanediol, trimethylolpropane, glycerol and pentaerythritol;

polyalkylene oxides having 2 to 6 terminals and 2 to 6 hydroxyl groups at the terminals and having a molecular weight of 100 to 10,000, such as polyethylene oxide, polypropylene oxide and copolymers thereof;

polyvalent amines having 2 to 20 carbon atoms and 2 to 3 secondary amino groups, such as n,n'-dimethylethylenediamine, n,n'-diethylethylenediamine and di(2-methylaminoethyl)amine;

saturated cyclic secondary amines having 4 to 10 carbon atoms, such as pyrrolidine, piperidine, morpholine and 1,2,3,4-tetrahydroquinoline; and cyclic polyvalent amines having 4 to 10 carbon atoms and 2 to 3 secondary amino groups, such as piperazine, pyrazine and 1,4,7-triazacyclononane.

Alkylene Oxide Compound

Examples of the alkylene oxide compounds used for preparing the polyoxyalkylene polyol for use in the invention include epoxy compounds, such as ethylene oxide, propylene oxide, 1,2-butylene oxide, 2,3-butylene oxide, styrene oxide, cyclohexene oxide, epichlorohydrin, epibromohydrin, methyl glycidyl ether, allyl glycidyl ether and phenyl glycidyl ether. Of the alkylene oxides, preferable are ethylene oxide, propylene oxide, 1,2-butylene oxide and styrene oxide, and more preferable are ethylene oxide and propylene oxide.

These compounds may be used singly or in combination of two or more kinds. When these compounds are used in combination, use of plural alkylene oxide compounds at the same time, use of them in order, or repeated use of them in order is available. In such combination use, the proportion of ethylene oxide in all the alkylene oxides is particularly preferably in the range of 5 to 30% by weight.

Polymer Polyol

The polymer polyol (sometimes referred to as "polymer-dispersed polyol" hereinafter) used in the invention is a dispersion of vinyl polymer particles (sometimes referred to as "polymer microparticles" hereinafter) obtained by dispersion polymerization of a compound having an unsaturated bond such as acrylonitrile or styrene in a polyol using a radical initiator such as azobisisobutyronitrile.

The vinyl polymer particles may be vinyl polymer particles made of a homopolymer of a compound having an unsaturated bond, but in the invention, at least a part of the compound having an unsaturated bond such as acrylonitrile is preferably grafted on the polyol that is a dispersion medium. Thus, the polyol is sometimes used as a non-reaction solvent or sometimes used as a reaction solvent in the present invention.

The polyol used herein may be any one of the aforesaid polyols but preferably is a polyoxyalkylene polyol.

In the polymer-dispersed polyol for use in the invention, the proportion of the polymer microparticles to the polyoxyalkylene polyol is in the range of usually 2 to 50% by weight, preferably 10 to 40% by weight.

Compound having Unsaturated Bond

The compound having an unsaturated bond is a compound having an unsaturated bond in its molecule, and is for example acrylonitrile or styrene.

Such compounds can be used singly or in combination. In the present invention, it is preferable to use a mixture of two or more compounds each having an unsaturated bond.

In the preparation of the polymer-dispersed polyol, a dispersion stabilizer, a chain transfer agent, etc. may be used in addition to the compound having an unsaturated bond.

Blowing Agent

Water reacts with polyisocyanate to generate a carbonic acid gas capable of blowing (foaming) a polyurethane resin, so that water is used as a blowing agent in the invention.

The amount of water generally used is in the range of preferably 2,to 7 parts by weight, more preferably 2.5 to 6 parts by weight, based on 100 parts by weight of the total of the polyol and/or the polymer polyol.

Chlorofluorocarbons, hydroxychlorofluorocarbons (e.g., HCFC-134a), hydrocarbons (e.g., cyclopentane) and other blowing agents developed for the purpose of global environmental protection may be used as blowing additives in combination with water without departing from the spirit of the present invention. Foaming may be carried out by the use of only a blowing agent other than water.

Catalyst

As the catalyst for use in the production of the flexible polyurethane cold cure molded foam of the invention, any of hitherto known catalysts can be used without specific limitation. For example, aliphatic amines such as triethylenediamine, bis(n,n-dimethylaminoethyl ether) and morpholines; and organotin compounds such as tin octanoate and dibutyltin dilaurate are used.

These catalysts can be used singly or in combination of two or more kinds.

The catalyst is used in an amount of preferably 0.005 to 10 parts by weight based on 100 parts by weight of the total of the polyol and/or the polymer polyol.

Other Additives

In the present invention, additives such as a crosslinking agent and a foam stabilizer can be used without imparing the object of the invention.

Crosslinking Agent

The crosslinking agent is not necessarily used in the invention. If used, a compound having a hydroxyl value of 200 to 1800 mgKOH/g is available as the crosslinking agent.

For example, aliphatic polyhydric alcohols such as glycerol and alkanolamines such as diethanolamine and triethanolamine are used.

Further, a polyoxyalkylene polyol having a hydroxyl value of 200 to 1800 mgKOH/g and hitherto known crosslinking agents are also employable. The crosslinking agent can be used in an amount of 0.5 to 10 parts by weight based on 100 parts by weight of the total of the polyol and/or the polymer polyol.

Foam Stabilizer

As the foam stabilizer which is optionally used in the invention, an organosilicon base surfactant commonly used is employable.

For example, SRX-274C, SF-2969, SF-2961 and SF-2962 (trade names) available from Dow Corning Toray Co. and L-5309, L-3601, L-5307 and L-3600 available from Nippon Unicar Co. are employable.

The foam stabilizer is used in an mount of 0.2 to 3 parts by weight based on 100 parts by weight of the total of the polyol and/or the polymer polyol.

Resin Premix

A mixture of the polyol and/or the polymer polyol, and if necessary, a crosslinking agent, a surfactant, water and a catalyst is referred to as a "resin premix".

To the resin premix, additives such as a flame retardant, a pigment, an ultraviolet light absorber and an antioxidant can be added, if desired.

Polyisocyanate

There is no specific limitation on the polyisocyanate to be reacted with the resin premix, but preferably used is tolylene diisocyanate hitherto known (preferably tolylene diisocyanate having a 2,4-isomer/2, 6-isomer ratio of 80/20, although the isomeric ratio is not specifically limited) or a mixture of tolylene diisocyanate and polymethylenepolyphenyl polyisocyanate represented by the following formula (1) (e.g., Cosmonate M-200 (trade name) available from Mitsui Chemicals Inc.).

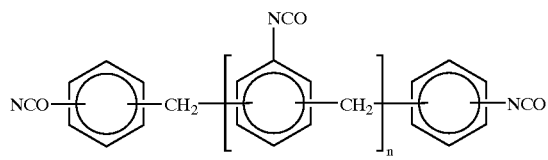

(1)

In the formula (1), n is 0 or an integer of 1 or more.

The isomers of an ingredient having 0 as n in the formula (1) which represents polymethylenepolyphenyl polyisocyanate are a 2,4'-isomer, a 4,4'-isomer and a 2,2'-isomer. Although the ratio of these isomers is not specifically limited, the amount of the 2,2'-isomer is trace, and the amount of the 2,4'-isomer is less than 10%. Although the amount of the ingredient having 0 as n is not specifically limited, polymethylenepolyphenyl polyisocyanate containing less than 50% of this ingredient having 0 as n is generally employed.

When a mixture of tolylene diisocyanate and polymethylenepolyphenyl polyisocyanate is used as the polyisocyanate, the mixing ratio therebetween suitable for the production of the flexible polyurethane cold cure molded foam is in the range of 98:2 to 50:50, by weight.

A composition comprising polymethylenepolyphenyl polyisocyanats which are different in the degree of polymerization can also be preferably employed as the polyisocyanate. Further, a mixture of such a polyisocyanate (i.e., polymethylenepolyphenyl polyisocyanate composition) or its urethane modified product and tolylene diisocyanate can also be preferably employed.

When the NCO index given when an organic polyisocyanate is used in the production of a flexible polyurethane cold cure molded foam in such an amount as contains isocyanate groups stoichiometrically equal to the total of functional groups reactive to the isocyanate group, such as a hydroxyl group and an amino group in the resin premix, is defined to be 1.00, the NCO index in the invention is preferably not less than 0.70 and not more than 1.40.

Process for Producing Flexible Polyurethane Cold Cure Molded Foam

There is no specific limitation on the process for producing a flexible polyurethane foam, but in general, a process comprising mixing the resin premix with the polyisocyanate by using a high-pressure foaming machine, a low pressure foaming machine or the like is adopted.

The low-pressure foaming machine can mix components exceeding2, and thus polyol, water, organotin catalyst, flame retardant and isocyanate can be separately fed to the mixing head and mixed. A mixed liquid obtained by such mixing is fed to a mold and then subjected to foaming, filling and curing to obtain a desired product of a given shape. The curing time is usually in the range of 30 seconds to 30 minutes, the mold temperature is in the range of room temperature to about 80° C., and the curing temperature is in the range of room temperature to 80° C. The production of a flexible polyurethane foam according to the invention is carried out under these curing conditions, and this process is generally called "cold cure process". After curing, the temperature of the cured product may be raised up to 80 to 180° C. within limits not detrimental to the object and effect of the invention.

The resin premix is generally mixed with the polyisocyanate by a high-pressure foaming machine or a low-pressure foaming machine. When a compound exhibiting hydrolyzability such as an organotin compound is used as a catalyst, it is preferable that the organotin catalyst line is separated from the water line to avoid contact therebetween and that they are mixed by a mixing head of the foaming machine.

The viscosity of the resin premix used is preferably not more than 2500 mPa.s from the viewpoints of mixing properties in the foaming machine and moldability into a foam.

EXAMPLE

The present invention is further described with reference to the following examples, but it should be construed that the invention is in no way limited to those examples.

The terms "part(s)" and "%" used in the examples mean "part(s) by weight" and "% by weight", respectively.

In the synthesis examples and the examples, overall density, hardness of a foam, wet heat compression set, hardness change ratio in a repeated compression test, elongation, hydroxyl value, overall degree of unsaturation and head-to-tail linkage selectivity were measured in accordance with the following methods.

Measuring Methods (1) Overall Density

The overall density was measured in accordance with the method described in JIS K-6400. The overall density means an "apparent density" defined by JIS. In the present invention, measurement of the overall density was carried out using a rectangular parallelepiped foam sample having a skin.

(2) Hardness of Foam

The hardness (25% ILD) of a foam was measured by the A method described in JIS K-6400. A foam having a thickness of 94 to 100 mm was used as a sample.

(3) Wet Heat Compression Set

The wet heat compression set was measured by the compression permanent set measuring method described in JIS K-6400 (damp heat compression set). In the measurement, a core portion of a molded flexible foam was cut to give a test specimen having a size of 50×50×25 mm. The test specimen was compressed to reduce its thickness to 50%, inserted between parallel flat plates and allowed to stand for 22 hours under the conditions of a temperature of 50° C and a relative humidity of 95%. Then, the specimen was taken out, and after 30 minutes, the thickness of the specimen was measured. The measured thickness was compared with the thickness before the test to determine a strain ratio, and the strain ratio was taken as a wet heat compression set. In Tables 4 to 9, the wet heat compression set was indicated by wet heat durability (Wet set (%) )

(4) Hardness Change Ratio in Repeated Compression Test

The hardness change ratio in a repeated compression test (fatigue by constant-load pounding) was measured by the repeated compression permanent set measuring method (A method) described in JIS K-6400 (fatigue by constant-load pounding). In the measurement, a core portion of a molded flexible foam was cut to give a test specimen having a size of 100×100×50 mm. The test specimen was inserted between parallel flat plates, and compression (compression to 50% thickness) was continuously repeated 80,000 times under the conditions of room temperature and a rate of 60 times/min. Then, the specimen was taken out, and after 30 minutes, the hardness of the specimen was measured. The measured hardness was compared with the hardness before the test to determine the hardness change ratio. In Tables 4 to 9, the hardness change ratio was indicated by hardness loss (%).

A change ratio of 25% CLD was used as the hardness change ratio in this measurement. The 25% CLD was measured by the same measuring apparatus as that of 25% ILD. A measuring condition was as follows.

The test specimen, having a size of 100×100×50 mm and a thickness of 50 mm, was compressed to reduce 75% of its thickness at a compression rate of 50 mm/min. (preliminary compression), released to compress and allowed to stand for 1 minute. Then, the test specimen was compressed to reduce 25% of its thickness at a compression rate of 50 mm/min. A drag was measured after keeping the compression for 20 seconds. This drag was the hardness (25% CLD).

(5) Elongation

The tensile elongation was measured by the method described in JIS K-6400.

(6) Hydroxyl Value

The hydroxyl value was measured by the method described in JIS K-1557.

(7) Overall Degree of Unsaturation

The overall degree of unsaturation was measured by the method described in JIS K-1557.

(8) Head-to-tail Linkage Selectivity

A $C^{13}$-NMR spectrum of the polyoxyalkylene polyol was measured by a $C^{13}$-nuclear magnetic resonance ($C^{13}$-NMR) apparatus (400 MHz, manufactured by Japan Electron Optics Laboratory Co., Ltd.) using deuterized chloroform as a solvent. From the spectrum, an area ratio of a signal (16.9 to 17.4 ppm) of a methyl group on an oxypropylene segment of head-to-tail linkage to a signal (17.7 to 18.5 ppm) of a methyl group on an oxypropylene segment of head-to-head bonding is calculated to determine the head-to-tail linkage selectivity.

The assignment of each signal was carried out based on the value described in the report, F. C. Schiling and A. E. Tonelli, Macromolecules, 19, 1337–1343 (1986).

Synthesis of polyoxyalkylene polyol

Synthesis Example 1

Synthesis of polyoxyalkylene polyol A

To 1 mol of glycerol, 0.01 mol of tetrakis(tris (dimethylamino)phosphoranilideneamino)-phosphonium hydroxide was added, and the mixture was dehydrated under reduced pressure at 100° C. for 6 hours. Thereafter, addition polymerization of propylene oxide was carried out at a reaction temperature of 80° C. under the maximum reaction pressure of 3.8 kg/cm$^2$, and then addition polymerization of ethylene oxide was carried out at a reaction temperature of 100° C. to obtain a polyoxyalkylene polyol A having a hydroxyl value of 28 mgKOH/g.

In the polyoxyalkylene polyol A thus obtained, the terminal oxyethylene group content was 15% by weight, the overall degree of unsaturation was 0.015 meq/g, and the head-to-tail linkage selectivity was 96.7%.

Synthesis Examples 2–4

Synthesis of polyoxyalkylene polyols B, C and D

Polyoxyalkylene polyols B, C and D were each synthesized in the same manner as in Synthesis Example 1, except that the active hydrogen compound as an initiator and the hydroxyl value of the resulting polyoxyalkylene polyol were changed as shown in Table 1.

The structures of the polyoxyalkylene polyols A to D and the analytical values thereof are set forth in Table 1. When the number of hydroxyl groups is 3 in Table 1, glycerol was used as the active hydrogen compound. When the number of hydroxyl groups is 4 in Table 1, pentaerythritol was used as the active hydrogen compound.

TABLE 1

| Polyoxyalkylene polyol | A | B | C | D |
|---|---|---|---|---|
| Number of hydroxyl groups of active hydrogen compound | 3 | 3 | 4 | 3 |
| Hydroxyl value (mgKOH/g) | 28 | 34 | 28 | 24 |
| Terminal oxyethylene group content (wt %) | 15 | 15 | 15 | 15 |
| Overall degree of unsaturation (meq/g) | 0.015 | 0.012 | 0.015 | 0.020 |
| Head-to-tail linkage selectivity (%) | 96.7 | 97.2 | 96.9 | 96.8 |

Synthesis Example 5

Synthesis of polyoxyalkylene polyol E

To 1 mol of glycerol, 0.37 mol of potassium hydroxide was added, and the mixture was dehydrated under reduced pressure at 100° C. for 6 hours. Thereafter, addition polymerization of propylene oxide was carried out at a reaction temperature of 115° C. under the maximum reaction pressure of 5.0 kg/cm$^2$, and then addition polymerization of ethylene oxide was carried out at a reaction temperature of 115° C. to obtain a polyoxyalkylene polyol E having a hydroxyl value of 28 mgKOH/g.

In the polyoxyalkylene polyol E thus obtained, the terminal oxyethylene group content was 15% by weight, the overall degree of unsaturation was 0.065 meq/g, and the head-to-tail linkage selectivity was 96.2%.

Synthesis Examples 6 and 7

Synthesis of Polyoxyalkylene Polyols F and G

Polyoxyalkylene polyols F and G were each synthesized in the same manner as in Synthesis Example 5, except that the active hydrogen compound as an initiator and the hydroxyl value of the resulting polyoxyalkylene polyol were changed as shown in Table 2.

The structures of the polyoxyalkylene polyols E to G and the analytical values thereof are set forth in Table 2. When the number of hydroxyl groups is 3 in Table 2, glycerol was used as the active hydrogen compound. When the number of hydroxyl groups is 4 in Table 2, pentaerythritol was used as the active hydrogen compound.

TABLE 2

| Polyoxyalkylene polyol | E | F | G |
|---|---|---|---|
| Number of hydroxyl groups of active hydrogen compound | 3 | 3 | 4 |
| Hydroxyl value (mgKOH/g) | 28 | 34 | 28 |
| Terminal oxyethylene group content (wt %) | 15 | 15 | 15 |
| Overall degree of unsaturation (meq/g) | 0.065 | 0.051 | 0.052 |
| Head-to-tail linkage selectivity (%) | 96.2 | 96.5 | 96.7 |

Synthesis Example 8

Synthesis of Polyoxyalkylene Polyol H

To 1 mol of glycerol, 0.23 mol of cesium hydroxide was added, and the mixture was dehydrated under reduced pressure at 100° C. for 6 hours. Thereafter, addition polymerization of propylene oxide was carried out at a reaction temperature of 80° C. under-the maximum reaction pressure of 3.5 kg/cm$^2$, and then addition polymerization of ethylene oxide was carried out at a reaction temperature of 100° C. to obtain a polyoxyalkylene polyol H having a hydroxyl value of 28 mgKOH/g.

In the polyoxyalkylene polyol H thus obtained, the terminal oxyethylene group content was 15% by weight, the overall degree of unsaturation was 0.016 meq/g, and the head-to-tail linkage selectivity was 97.1%.

Synthesis Examples 9–11

Synthesis of polyoxyalkylene polyols I. J and K

Polyoxyalkylene polyols I, J and K were each synthesized in the same manner as in Synthesis Example 8, except that the active hydrogen compound as an initiator and the hydroxyl value of the resulting polyol were changed as shown in Table 3.

The structures of the polyoxyalkylene polyols H to K and the analytical values thereof are set forth in Table 3. When the number of hydroxyl groups is 3 in Table 3, glycerol was used as the active hydrogen compound. When the number of hydroxyl groups is 4 in Table 3, pentaerythritol was used as the active hydrogen compound.

TABLE 3

| Polyoxyalkylene polyol | H | I | J | K |
|---|---|---|---|---|
| Number of hydroxyl groups of active hydrogen compound | 3 | 3 | 4 | 3 |
| Hydroxyl value (mgKOH/g) | 28 | 34 | 28 | 24 |
| Terminal oxyethylene group content (wt %) | 15 | 15 | 15 | 15 |
| Overall degree of unsaturation (meq/g) | 0.016 | 0.014 | 0.018 | 0.021 |
| Head-to-tail linkage selectivity (%) | 97.1 | 97.3 | 97.1 | 97.2 |

Synthesis of Polymer Polyol

Synthesis Example-21

Synthesis of polymer polyol a

In the polyoxyalkylene polyol B having a hydroxyl value of 34 mgKOH/g obtained in Synthesis Example 2, graft polymerization of acrylonitrile and styrene was carried out to obtain a polymer polyol a having a hydroxyl value of 28 mgKOH/g. In the polymer polyol a, the vinyl polymer content was 20% by weight. The total amount of acrylonitrile and styrene used was 20% by weight based on 100% by weight of the total of the polyoxyalkylene polyol B, acrylonitrile and styrene used.

In more detail, the polymer polyol a was synthesized in the following manner.

Starting materials are as follows.

Radical polymerization initiator: 2,2'-azobis(2-isobutyronitrile) Dispersion stabilizer: polyether ester polyol having a hydroxyl value (OHV) of 29 mgKOH/g, which is obtained by a process comprising addition polymerizing glycerol with propylene oxide and then with ethylene oxide using KOH as a catalyst to obtain a polyol having a hydroxyl value (OHV) of 34 mgKOH/g and a terminal ethylene oxide (EO) content of 14% by weight and then reacting the thus obtained polyol with maleic anhydride and ethylene oxide.

A 1 liter pressure-resistant autoclave equipped with a thermometer, a stirrer, a pressure gauge and a liquid feeder was filled full with the polyoxyalkylene polyol B, and the temperature of the system was raised to 120° C. with stirring. To the autoclave, a mixed liquid of the polyoxyalkylene polyol B, a radical polymerization initiator, acrylonitrile, styrene and a dispersion stabilizer was continuously fed, and the reaction liquid was continuously discharged from the discharge port except the liquid initially resided, to obtain a polymer polyol a. The reaction temperature was 120° C., the reaction pressure was 440 kPa, and the residence time was 50 minutes. The resulting reaction liquid was subjected to a reduced pressure heat treatment at 120° C. under a pressure of not more than 655 Pa for 3 hours to remove unreacted acrylonitrile, unreacted styrene and decomposition products of the radical polymerization initiator. The charges of the starting materials are as follows.
Polyoxyalkylene polyol B: 7500 g
Radical initiator: 50 g
Acrylonitrile: 1500 g
Styrene: 500 g
Dispersion stabilizer: 500 g

Synthesis Example-22

Synthesis of Polymer Polyol B

In the polyoxyalkylene polyol F having a hydroxyl value of 34 mgKOH/g obtained in Synthesis Example 6, graft polymerization of acrylonitrile and styrene was carried out to obtain a polymer polyol b having a hydroxyl value of 28 mgKOH/g. In the polymer polyol b, the vinyl polymer content was 20% by weight.

In more detail, the polymer polyol b was synthesized in the following manner.

A 1 liter pressure-resistant autoclave equipped with a thermometer, a stirrer, a pressure gauge and a liquid feeder was filled full with the polyoxyalkylene polyol F, and the temperature of the system was raised to 120° C. with stirring. To the autoclave, a mixed liquid of the polyoxyalkylene polyol F, a radical polymerization initiator, acrylonitrile, styrene and a dispersion stabilizer was continuously fed, and the reaction liquid was continuously discharged from the discharge port except the liquid initially resided, to obtain a polymer polyol b. The reaction temperature was 120° C., the reaction pressure was 440 kPa, and the residence time was 50 minutes. The resulting reaction liquid was subjected to a reduced pressure heat treatment at 120° C. under a pressure of not more than 655 Pa for 3 hours to remove unreacted acrylonitrile, unreacted styrene and decomposition products of the radical polymerization initiator. The charges of the starting materials are as follows.

Polyoxyalkylene polyol F: 7500 g
Radical initiator: 50 g
Acrylonitrile: 1500 g
Styrene: 500 g
Dispersion stabilizer: 500 g Synthesis Example-23

Synthesis of polymer polyol c

In the polyoxyalkylene polyol I having a hydroxyl value of 34 mgKOH/g obtained in Synthesis Example 9, graft polymerization of acrylonitrile and styrene was carried out to obtain a polymer polyol c having a hydroxyl value of 28 mgKOH/g. In the polymer polyol c, the vinyl polymer content was 20% by weight In more detail, the polymer polyol c was synthesized in the following manner.

A 1 liter pressure-resistant autoclave equipped with a thermometer, a stirrer, a pressure gauge and a liquid feeder was filled full with the polyoxyalkylene polyol I, and the temperature of the system was raised to 120° C. with stirring. To the autoclave, a mixed liquid of the polyoxyalkylene polyol I, a radical polymerization initiator, acrylonitrile, styrene and a dispersion stabilizer was continuously fed, and the reaction liquid was continuously discharged from the discharge port except the liquid initially resided, to obtain a polymer polyol c. The reaction temperature was 120° C., the reaction pressure was 440 kPa, and the residence time was 50 minutes. The resulting reaction liquid was subjected to a reduced pressure heat treatment at 120° C. under a pressure of not more than 655 Pa for 3 hours to remove unreacted acrylonitrile, unreacted styrene and decomposition products of the radical polymerization initiator. The charges of the starting materials are as follows.

Polyoxyalkylene polyol I: 7500 g
Radical polymerization initiator: 50 g
Acrylonitrile: 1500 g
Styrene: 500 g
Dispersion stabilizer: 500 g Production of Flexible Polyurethane Cold Cure Molded Foam As the Polyisocyanates, the Following Materials Were Used.

Polyisocyanate-1

Cosmonate TM-20 (trade name): available from Mitsui Chemicals Inc., a mixture consisting of 80 parts by weight of a mixture of 2,4-tolylene diisocyanate and 2,6-tolylene diisocyanate in a weight ratio of 80:20 and 20 parts by weight of polymethylenepolyphenyl polyisocyanate Polyisocyanate-2

Cosmonate T-80 (trade name): available from Mitsui Chemicals Inc., a mixture of 2,4-tolylene diisocyanate and 2,6-tolylene diisocyanate in a weight ratio of 80:20.

In addition to the above-mentioned polyoxyalkylene polyols, polymer polyols and polyisocyanates, the following materials were used.

Catalyst-1

Minico L-1020 (trade name): amine catalyst (33% diethylene glycol solution of triethylenediamine), available from Katsuzai Chemicals Co.

Catalyst-2

Minico TMDA (trade name) :amine catalyst, available from Katsuzai Chemicals Co.

Crosslinking Agent-1

KL-210 (trade name): crosslinking agent having a hydroxyl value of 830 mgKOH/g, available from Mitsui Chemicals Inc.

Foam Stabilizer-1

SRX-274C (trade name): silicone foam stabilizer, available from Toray Dow Corning Silicone Co.

The term "density" used in the examples and the comparative examples means an overall density. Comparison between polyoxyalkylene polyol using a compound having a nitrogen-phosphorus double bond as a polyol synthesizing catalyst and polyoxyalkylene polyol using potassium hydroxide as a polyol-synthesizing catalyst

EXAMPLE 1

The following seven ingredients were mixed to prepare a resin liquid (resin premix).

Polyoxyalkylene polyol A: 50 parts
Polymer polyol a: 50 parts
Crosslinking agent-1: 3.0 parts
Water: 4.2 parts
Catalyst- 1: 0.4 part
Catalyst- 2: 0.1 part
Foam stabilizer-1: 1.0 part The polyoxyalkylene polyol A was used as a polyoxyalkylene polyol, and the polymer polyol a was used as a polymer polyol. 108.7 Parts of the resin liquid was mixed with 55.3 parts of the isocyanate-1, and the resulting mixture was immediately poured into a mold (internal dimension: 400×400×100 mm) having been beforehand adjusted to 65° C. Then, the mold was closed to carry out foaming.

Thereafter, the mold was placed in a hot-air oven at a preset temperature of 100° C. to heat and cure the foam in the mold for 7 minutes, followed by taking the resulting flexible foam out of the mold. Properties of the flexible foam are set forth in Table 4.

The equivalent ratio (NCO/H) (NCO index) of the polyisocyanate-1 to active hydrogen in the resin liquid (resin premix) was 1.05.

EXAMPLE 2

A flexible foam was obtained in the same manner as in Example 1, except that the overall density (apparent density) of the resulting flexible foam was controlled to 42.7 kg/m3 from 35.1 kg/m$^3$. Properties of the flexible foam are set forth 10 in Table 4.

EXAMPLE 3–7

Flexible foams were each obtained in the same manner as in Example 1, except that the polyoxyalkylene polyol,A was replaced with each of the polyoxyalkylene polyols B to D and the overall density (apparent density) of the resulting flexible foam was controlled as shown in Table 4. Properties of the flexible foams are set forth in Table 4.

TABLE 4

|  | Ex. 1 | Ex. 2 | Ex. 3 | Ex. 4 |
|---|---|---|---|---|
| Polyoxyalkylene polyol | A | A | B | B |
| Polymer polyol | a | a | a | a |
| Viscosity of resin Premix (mPa · s) | 2100 | 2100 | 2000 | 2000 |
| Properties of soft foam |  |  |  |  |
| Overall density (kg/m³) | 35.1 | 42.7 | 34.8 | 42.2 |
| Hardness 25% ILD *1 (kgf/314 cm²) | 18.0 | 23.0 | 18.3 | 22.8 |
| Wet heat durability *1 Wet set (%) | 13.6 | 11.1 | 13.5 | 12.2 |
| Repeated compression test Hardness loss (%) *1 | 11.1 | 10.3 | 11.7 | 10.9 |
| Elongation (%) *1 | 106 | 111 | 108 | 112 |

|  | Ex. 5 | Ex. 6 | Ex. 7 |
|---|---|---|---|
| Polyoxyalkylene polyol | C | C | D |
| Polymer polyol | a | a | a |
| Viscosity of resin Premix (mPa · s) | 2200 | 2200 | 3000 |
| Properties of soft foam |  |  |  |
| Overall density (kg/m³) | 35.1 | 42.3 | 35.0 |
| Hardness 25% ILD *1 (kgf/314 cm²) | 18.5 | 22.9 | 17.5 |
| Wet heat durability *1 Wet set (%) | 13.1 | 11.9 | 13.6 |
| Repeated compression test Hardness loss (%) *1 | 11.2 | 10.4 | 11.5 |
| Elongation (%) *1 | 104 | 107 | 105 |

*1 in accordance with JIS K-6400

Comparative Examples 1–6

Flexible foams were each obtained in the same manner as in Example 1, except that the polyoxyalkylene polyol A was replaced with each of the polyoxyalkylene polyols E to G, the polymer polyol a was replaced with the polymer polyol b, and the overall density (apparent density) of the resulting flexible foam was controlled as shown in Table 5. Properties of the flexible foams are set forth in Table 5.

The equivalent ratio (NCO/H) (NCO index) of the polyisocyanate-1 to active hydrogen in the resin liquid (resin premix) was 1.05.

TABLE 5

|  | Comp. Ex. 1 | Comp. Ex. 2 | Comp. Ex. 3 |
|---|---|---|---|
| Polyoxyalkylene polyol | E | E | F |
| Polymer polyol | b | b | b |
| Viscosity of resin Premix (mPa · s) | 2100 | 2100 | 2000 |
| Properties of soft foam |  |  |  |
| Overall density (kg/m³) | 35.2 | 42.1 | 34.9 |
| Hardness 25% ILD *1 (kgf/314 cm²) | 17.7 | 22.9 | 18.1 |
| Wet heat durability *1 Wet set (%) | 17.2 | 16.3 | 18.8 |
| Repeated compression test Hardness loss (%) *1 | 18.3 | 16.1 | 18.9 |
| Elongation (%) *1 | 110 | 112 | 108 |

TABLE 5-continued

|  | Comp. Ex. 4 | Comp. Ex. 5 | Comp. Ex. 6 |
|---|---|---|---|
| Polyoxyalkylene polyol | E | G | G |
| Polymer polyol | b | b | b |
| Viscosity of resin Premix (mPa · s) | 2000 | 2200 | 2200 |
| Properties of soft foam |  |  |  |
| Overall density (kg/m³) | 41.8 | 34.8 | 42.2 |
| Hardness 25% ILD *1 (kgf/314 cm²) | 23.1 | 18.3 | 23.8 |
| Wet heat durability *1 Wet set (%) | 17.4 | 19.2 | 16.7 |
| Repeated compression test Hardness loss (%) *1 | 16.2 | 18.1 | 15.9 |
| Elongation (%) *1 | 111 | 108 | 109 |

*1 in accordance with JIS K-6400

From Table 4 and Table 5, the following can be understood. The flexible foams of Examples 1 to 7 are excellent in the wet heat compression set and the change of hardness in the repeated compression test. On the other hand, the flexible foams of Comparative Examples 1 to 6 using polyols excluded from the scope of the invention are poor in the flexible foam properties. The resin premixes used in the production of the flexible foams of Examples 1 to 6 have lower viscosity than the resin premix in Example 7 and thereby show better mixing properties and flowability, so that these resin premixes are more preferable.

Examples 8–12

Flexible foams were each obtained in the same manner as in Example 1, except that the polyoxyalkylene polyol A was replaced with each of the polyoxyalkylene polyols B to D, the polyisocyanate-1 was replaced with the polyisocyanate-2, and the overall density (apparent density) of the resulting flexible foam was controlled as shown in Table 6. Properties of the flexible foams are set forth in Table 6.

The equivalent ratio (NCO/H) (NCO index) of the polyisocyanate-2 to active hydrogen in the resin liquid (resin premix) was 1.05.

TABLE 6

|  | Ex. 8 | Ex. 9 | Ex.10 | Ex. 11 | Ex. 12 |
|---|---|---|---|---|---|
| Polyoxyalkylene polyol | B | B | C | C | D |
| Polymer polyol | a | a | a | a | a |
| Viscosity of resin Premix (mPa · s) | 2000 | 2000 | 2200 | 2200 | 3000 |
| Properties of soft foam |  |  |  |  |  |
| Overall density (kg/m³) | 37.2 | 42.2 | 37.2 | 42.7 | 37.4 |
| Hardness 25% ILD *1 (kgf/314 cm²) | 17.6 | 22.8 | 18.3 | 23.1 | 16.9 |
| Wet heat durability *1 Wet set (%) | 13.8 | 13.2 | 13.8 | 12.9 | 13.4 |
| Repeated compression test Hardness loss (%) *1 | 12.2 | 11.1 | 13.1 | 12.2 | 11.9 |
| Elongation (%) *1 | 115 | 116 | 112 | 113 | 104 |

*1 in accordance with JIS K-6400

Comparative Examples 7–10

Flexible foams were each obtained in the same manner as in Example 1, except that the polyoxyalkylene polyol A was replaced with each of the polyoxyalkylene polyols F and D, the polymer polyol a was replaced with the polymer polyol b, the polyisocyanate-1 was replaced with the polyisocyanate-2, and the overall density (apparent density) of the resulting flexible foam was controlled as shown in Table 7. Properties of the flexible foams are set forth in Table 7.

The equivalent ratio (NCO/H) (NCO index) of the polyisocyanate-2 to active hydrogen in the resin liquid (resin premix) was 1.05.

TABLE 7

|  | Comp. Ex. 7 | Comp. Ex. 8 | Comp. Ex. 9 | Comp. Ex. 10 |
|---|---|---|---|---|
| Polyoxyalkylene polyol | F | F | G | G |
| Polymer polyol | b | b | b | b |
| Viscosity of resin Premix (mPa · s) | 2000 | 2000 | 2200 | 2200 |
| Properties of soft foam |  |  |  |  |
| Overall density (kg/m$^3$) | 37.1 | 42.3 | 37.0 | 42.2 |
| Hardness 25% ILD *1 (kgf/314 cm$^2$) | 18.2 | 22.2 | 18.4 | 22.4 |
| Wet heat durability *1 Wet set (%) | 19.2 | 17.4 | 17.1 | 14.2 |
| Repeated compression test Hardness loss (%) *1 | 17.9 | 17.3 | 18.9 | 17.4 |
| Elongation (%) *1 | 111 | 112 | 112 | 113 |

*1 in accordance with JIS K-6400

From Table 6 and Table 7, the following can be understood. The flexible foams of Examples 8 to 12 are excellent in the wet heat compression set and the change of hardness in the repeated compression test. On the other hand, the flexible foams of Comparative Examples 7 to 10 using polyols excluded from the scope of the invention are poor in the foam properties. The resin premixes used in the production of the flexible foams of Examples 8 to 11 have lower viscosity than the resin premix in Example 12 and thereby show better mixing properties and flowability, so that these resin premixes are more preferable.

Comparison Between Polyoxyalkylene Polyol using Cesium Hydroxide as a Polyol Synthesizing Catalyst and Polyoxyalkylene Polyol using Potassium Hydroxide as a Polyol-synthesizing Catalyst Examples 13–19

Flexible foams were each obtained in the same manner as in Example 1, except that the polyoxyalkylene polyol A was replaced with each of the polyoxyalkylene polyols H to K, the polymer polyol a was replaced with the polymer polyol c, and the overall density (apparent density) of the resulting flexible foam was controlled as shown in Table 8. Properties of the flexible foams are set forth in Table 8.

TABLE 8

|  | Ex. 13 | Ex. 14 | Ex.15 | Ex.16 |
|---|---|---|---|---|
| Polyoxyalkylene polyol | H | H | I | I |
| Polymer polyol | c | c | c | c |
| Viscosity of resin Premix (mPa · s) | 2100 | 2100 | 2000 | 2000 |
| Properties of soft foam |  |  |  |  |
| Overall density (kg/m$^3$) | 34.9 | 42.6 | 35.1 | 42.1 |
| Hardness 25% ILD *1 (kgf/314 cm$^2$) | 18.1 | 22.8 | 18.2 | 23.2 |
| Wet heat durability *1 Wet set (%) | 13.8 | 11.8 | 13.8 | 12.4 |
| Repeated compression test Hardness loss (%) *1 | 11.8 | 10.8 | 12.1 | 11.5 |
| Elongation (%) *1 | 104 | 108 | 106 | 109 |

|  | Ex. 17 | Ex. 18 | Ex. 19 |
|---|---|---|---|
| Polyoxyalkylene polyol | J | J | K |
| Polymer polyol | c | c | c |
| Viscosity of resin Premix (mPa · s) | 2200 | 2200 | 3000 |
| Properties of soft foam |  |  |  |
| Overall density (kg/m$^3$) | 35.2 | 42.2 | 34.9 |
| Hardness 25% ILD *1 (kgf/314 cm$^2$) | 18.5 | 23.4 | 17.3 |
| Wet heat durability *1 Wet set (%) | 13.8 | 12.0 | 13.8 |
| Repeated compression test Hardness loss (%) *1 | 11.2 | 10.6 | 11.4 |
| Elongation (%) *1 | 103 | 106 | 106 |

*1 in accordance with JIS K-6400

From Table 8 and Table 5, the following can be understood. The flexible foams of Examples 13 to 19 are excellent in the wet heat compression set and the change of hardness in the repeated compression test. On the other hand, the flexible foams of Comparative Examples 1 to 6 using polyols excluded from the scope of the invention are poor in the foam properties. The resin premixes used in the production of the flexible foams of Examples 13 to 18 have lower viscosity than the resin premix in Example 19 and thereby show better mixing properties and flowability, so that these resin premixes are more preferable.

Examples 20–24

Flexible foams were each obtained in the same manner as in Example 1, except that the polyoxyalkylene polyol A was replaced with each of the polyoxyalkylene polyols I to K, the polymer polyol a was replaced with the polymer polyol c, the polyisocyanate-1 was replaced with the polyisocyanate-2, and the overall density (apparent density) of the resulting flexible foam was controlled as shown in Table 9. Properties of the flexible foams are set forth in Table 9.

The equivalent ratio (NCO/H) (NCO index) of the polyisocyanate-2 to active hydrogen in the resin liquid (resin premix) was 1.05.

TABLE 9

|  | Ex. 20 | Ex. 21 | Ex.22 | Ex.23 | Ex.24 |
|---|---|---|---|---|---|
| Polyoxyalkylene polyol | I | I | J | J | K |
| Polymer polyol | c | c | c | c | c |
| Viscosity of resin Premix (mPa · s) | 2000 | 2000 | 2200 | 2200 | 3000 |
| Properties of soft foam |  |  |  |  |  |
| Overall density (kg/m$^3$) | 37.4 | 42.3 | 37.5 | 42.1 | 37.6 |
| Hardness 25% ILD *1 (kgf/314 cm$^2$) | 17.5 | 21.9 | 18.3 | 22.4 | 17.0 |
| Wet heat durability *1 Wet set (%) | 13.9 | 13.3 | 13.7 | 12.7 | 13.8 |

TABLE 9-continued

| | Ex. 20 | Ex. 21 | Ex. 22 | Ex. 23 | Ex. 24 |
|---|---|---|---|---|---|
| Repeated compression test Hardness loss (%) *1 | 12.4 | 11.2 | 13.5 | 11.9 | 12.0 |
| Elongation (%) *1 | 113 | 115 | 108 | 111 | 105 |

*1 in accordance with JIS K-6400

From Table 9 and Table 7, the following can be understood. The flexible foams of Examples 20 to 24 are excellent in the wet heat compression set and the change of hardness in the repeated compression test. On the other hand, the flexible foams of Comparative Examples 7 to 10 using polyols excluded from the scope of the invention are poor in the foam properties. The resin premixes used in the production of the flexible foams of Examples 20 to 23 have lower viscosity than the resin premix in Example 24 and thereby show better mixing properties and flowability, so that these resin premixes are more preferable.

Effect of the Invention

The flexible polyurethane cold cure molded foam according to the invention has a low density and is excellent in durability, particularly in hardness change ratio in a repeated compression test and wet heat compression set.

The flexible polyurethane cold cure molded foam according to the invention has an overall density of not less than 35 kg/m$^3$ and not more than 45 kg/m$^3$ and a wet heat compression set of not more than 15%. Further, the hardness change ratio of the foam in a repeated compression test can be decreased to not more than 15%. Therefore, the flexible polyurethane cold cure molded foam of the invention is lightweight and excellent in durability such as strain property, and can be used as an excellent cushioning material for beds or vehicles.

By the process for producing a flexible polyurethane cold cure molded foam according to the invention, a flexible polyurethane cold cure molded foam exhibiting the above effects can be provided.

In the process of the invention, the viscosity of a resin premix can be decreased to not more than 2500 mPa.s by the use of a polyol which has been synthesized using a catalyst containing at least one compound selected from a compound having a nitrogen-phosphorus double bond, cesium hydroxide and rubidium hydroxide. Therefore, handling of the resin premix in the production of a polyurethane foam can be facilitated, or production of a flexible foam by an inexpensive apparatus becomes feasible. As a result, a flexible foam having a small wet heat compression set and a low hardness change ratio in a repeated compression test, namely, having excellent durability, can be easily produced.

What is claimed is:

1. A process for producing a flexible polyurethane cold cure molded foam having an overall density of not less than 35 kg/m$^3$ and not more than 45 kg/m$^3$ and a wet heat compression set of not more than 15%, wherein the flexible polyurethane cold cure molded foam is obtained from a polyol synthesized by a use of a catalyst containing at least one compound selected from the group consisting of a compound having a nitrogen-phosphorus double bond, cesium hydroxide and rubidium hydroxide, and the polyol being a polyoxyalkylene polyol;

said process comprising combining
a polyol (a) and/or
a polymer polyol containing dispersed polymer microparticles obtained by radical polymerizing a compound having an unsaturated bond in said polyol (a),
with water, a catalyst and a polyisocyanate, wherein:
said polyol (a) is a polyoxyalkylene polyol selected from the group consisting of
(1) a polyoxyalkylene polyol having a hydroxyl value of not less than 15 mgKOH/g and not more than 25 mgKOH/g and overall degree of unsaturation of not more than 0.060 meq/g,
(2) a polyoxyalkylene polyol having a hydroxyl value exceeding 25 mgKOH/g and not more than 35 mgKOH/g and overall degree of unsaturation of not more than 0.050 meq/g, and
(3) a polyoxyalkylene polyol having a hydroxyl value exceeding 35 mgKOH/g and not more than 45 mgKOH/g and overall degree of unsaturation of not more than 0.040 meq/g.

2. The process for producing a flexible polyurethane cold cure molded foam as claimed in claim 1, wherein a resin premix containing at least said polyol (a) and/or the polymer polyol, water and the catalyst has a viscosity of not more than 2500 mPa.s.

3. The process for producing a flexible polyurethane cold cure molded foam as claimed in claim 1, wherein the polyisocyanate is tolylene diisocyanate.

4. The process for producing a flexible polyurethane cold cure molded foam as claimed in claim 1, wherein the polyisocyanate is a mixture of tolylene diisocyanate and polymethylenepolyphenyl polyisocyanate in a weight ratio of 98:2 to 50:50, said polymethylenepolyphenyl polyisocyanate being represented by the following formula (1):

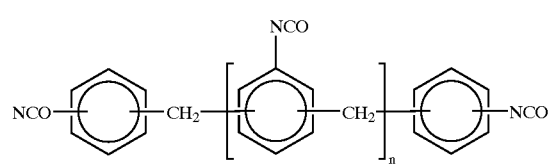

(1)

wherein n is 0 or an integer of 1 or more.

5. The process for producing a flexible polyurethane cold cure molded foam as claimed in claim 1, wherein the compound having a nitrogen-phosphorus double bond is a phosphazenium compound or a phosphine oxide compound.

6. A flexible polyurethane cold cure molded foam, having an overall density of not less than 35 kg/m$^3$ and not more than 37.6 kg/m$^3$ and a wet heat compression set of not more than 15%, wherein the flexible polyurethane cold cure molded foam is obtained by a reaction of a polyisocyanate with a polyol (a) containing a polyoxyalkylene polyol.

7. The flexible polyurethane cold cure molded foam having an overall density of not less than 35 kg/m$^3$ and not more than 37.6 kg/m$^3$ and a wet heat compression set of not more than 15%, wherein the flexible polyurethane cold cure molded foam is obtained by a reaction of a polyisocyanate with a polyol (a) containing a polyoxyalkylene polyol, wherein said polyol (a) is a polyoxyalkylene polyol selected from the group consisting of
(1) a polyoxyalkylene polyol having a hydroxyl value of not less than 15 mgKOH/g and not more than 25 mgKOH/g and overall degree of unsaturation of not more than 0.060 meq/g,
(2) a polyoxyalkylene polyol having a hydroxyl value exceeding 25 mgKOH/g and not more than 35 mgKOH/g and overall degree of unsaturation of not more than 0.050 meq/g, and (3) a polyoxyalkylene polyol having a hydroxyl value exceeding 35 mgKOH/g and not more than 45 mgKOH/g and overall degree of unsaturation of not more than 0.040 meq/g, and wherein the polyol is a polyol synthesized by use of a catalyst containing at least one compound selected from the group consisting of a compound having a nitrogen-phosphorus double bond, cesium hydroxide and rubidium hydroxide.

8. The flexible polyurethane cold cure molded foam as claimed in claim 6 or 7, wherein a resin premix containing at least said polyol (a) and/or the polymer polyol, water and the catalyst has a viscosity of not more than 2500 mpa.s.

9. The flexible polyurethane cold cure molded foam as claimed in any one of claims 6 and 7, wherein the polyisocyanate is tolylene diisocyanate.

10. The flexible polyurethane cold cure molded foam as claimed in any one of claims 6 and 7, wherein the polyisocyanate is a mixture of tolylene diisocyanate and polymethylenepolyphenyl polyisocyanate in a weight ratio of 98:2 to 50:50, said polymethylenepolyphenyl polyisocyanate being represented by the following formula (1):

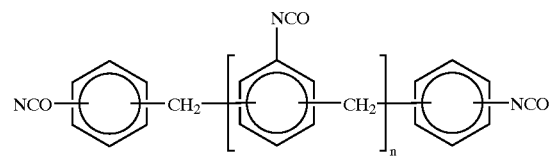

wherein n is 0 or an integer of 1 or more.

11. The flexible polyurethane cold cure molded foam as claimed in claim 6 or 7, wherein the foam has a hardness change ratio, as determined in a repeated compression test, of not more than 15%.

12. The flexible polyurethane cold cure molded foam as claimed in claim 6 or 7, wherein said polyol (a) is a polyol synthesized by the use of a catalyst containing at least one compound selected from the group consisting of a compound having a nitrogen-phosphorus double bond and cesium hydroxide.

13. The flexible polyurethane cold cure molded foam as claimed in claim 6 or 7, wherein the reaction was performed without substantially using an isocyanate-terminated prepolymer.

* * * * *